United States Patent [19]

Obara et al.

[11] Patent Number: 4,818,848
[45] Date of Patent: Apr. 4, 1989

[54] AUTOMATIC WIRE CONNECTING APPARATUS FOR WIRE CUT ELECTRIC DISCHARGE MACHINE

[75] Inventors: Haruki Obara, Sagamihara; Toshiyuki Aso, Hino; Hiroshi Kinoshita; Tamotsu Ishibashi, both of Hachioji, all of Japan

[73] Assignee: Fanuc Limited, Yamanashi, Japan

[21] Appl. No.: 52,734

[22] PCT Filed: Aug. 21, 1986

[86] PCT No.: PCT/JP86/00433
§ 371 Date: Apr. 21, 1987
§ 102(e) Date: Apr. 21, 1987

[87] PCT Pub. No.: WO87/01063
PCT Pub. Date: Feb. 26, 1987

[30] Foreign Application Priority Data

Aug. 21, 1985 [JP] Japan ................... 60-181618

[51] Int. Cl.$^4$ ............... B23H 7/02; B23H 7/10
[52] U.S. Cl. ........................... 219/69.12
[58] Field of Search ............ 219/69 W, 69 R; 204/206, 224 M; 83/639, 926 B; 92/23, 24, 27, 28

[56] References Cited

U.S. PATENT DOCUMENTS 3,891,819  6/1975  Ullmann et al. ............ 219/69 W

FOREIGN PATENT DOCUMENTS

56-82134   7/1981  Japan .................... 219/69 W
196128    11/1984  Japan .
131121     7/1985  Japan .
2073083   10/1981  United Kingdom ............ 219/69 M Primary Examiner—A. D. Pellinen
Assistant Examiner—Geoffrey S. Evans
Attorney, Agent, or Firm—Staas & Halsey

[57] ABSTRACT

An automatic wire connecting apparatus of a wire cut electric discharge machine performs automatic connection of a wire electrode smoothly and reliably. A wire processing unit (90) integrally rotatably coupled to a rotating shaft (61) of a pneumatic motor (60) has a nozzle forming portion (12) which defines a slit (S) that allows a wire electrode (W) to pass therethrough when it is opened, and which defines a nozzle hole (125) capable of fitting with an upper wire guide (12) when it is closed, and is selectively positioned at a wire insertion position or an escape position by a rotary stopper (150). When the wire electrode is broken, the wire processing unit is rotated from the escape position to the wire insertion position by a motor, and thereafter, the nozzle hole forming portion is closed, thereby holding the wire electrode guided through the slit during a rotating operation in the nozzle hole. When a working fluid is supplied from the upper wire guide to the nozzle hole, the wire electrode is fed while being restricted by the working fluid sprayed toward a workpiece (P), and is then automatically connected.

11 Claims, 4 Drawing Sheets

AUTOMATIC WIRE CONNECTING APPARATUS FOR WIRE CUT ELECTRIC DISCHARGE MACHINE

BACKGROUND OF THE INVENTION

The present invention relates to a wire cut electric discharge machine and, more particularly, to an automatic connecting apparatus for a wire electrode.

A wire cut electric discharge machine has been known, which comprises upper and lower wire guides respectively arranged above and below a workpiece table for supporting a workpiece, a wire feed mechanism for feeding the wire electrode downward while clamping it, and a wire recovery device arranged below the lower wire guide. In this conventional electric discharge machine, during electric discharge machining, the wire electrode is continuously fed downward by the wire feed mechanism, and is guided to the wire recovery device via wire paths defined in the wire guides. When the electric discharge machining position of the workpiece is to be changed, the wire electrode must be temporarily cut and must be automatically extended between the wire guides. When the wire electrode is broken in the electric discharge machining region, it is required to draw the broken wire electrode upward from the electric discharge machining region, and then cut a bent portion or a portion with a roughened surface of the wire electrode, and thereafter effect automatic extension of the wire electrode. For this reason, a wire cutting device is conventionally arranged above or below the upper wire guide.

In case that the wire cutting device is arranged above the upper wire guide, the used portion of the wire electrode which is cut from the remaining portion thereof by the wire cutting device is fed downward upon operation of the wire feed mechanism. At this time, the cut end of the wire electrode is easily caught in narrow wire paths of the wire guides and a hole or groove of the workpiece, and thus it is difficult to reliably perform an automatic extension operation of the wire electrode. Even if the wire cutting device is arranged below the upper wire guide, it is also difficult to smoothly pass the wire electrode through the hole or groove of the workpiece and the narrow wire path of the lower wire guide.

SUMMARY OF THE INVENTION

It is the object of the present invention to provide a compact, lightweight automatic wire connecting apparatus of a wire cut electric discharge machine, which can smoothly and reliably perform automatic connection of a wire electrode, can reduce the frequency of malfunction and can perform a safe operation.

In order to achieve the above object of the present invention, there is provided an automatic wire connecting apparatus of a wire cut electric discharge machine in which a wire electrode is fed through an upper wire guide arranged above a workpiece and a working fluid supplied to the upper wire guide is sprayed from the upper wire guide to the workpiece, comprising rotary driving means arranged to use a pressurized fluid as a driving source to effect rotary action; a wire processing unit coupled with a rotating shaft of the rotary driving means for rotation therewith; and positioning means for selectively positioning the wire processing unit at a wire insertion position or an escape position; the wire processing unit having an openable/closable nozzle hole forming portion, the forming portion defining a slit allowing the wire electrode to pass therethrough when it is opened and defining a nozzle hole capable of fitting with the upper wire guide when it is closed.

More preferably, the automatic wire connecting apparatus includes coupling means coaxially arranged with the rotating shaft of the rotary driving means; and axial driving means, which is arranged to use a compressed fluid as a driving source, for moving the wire processing unit in the axial direction of the rotating shaft of the rotary driving means. The wire processing unit is coupled to the rotating shaft of the rotary driving means through the coupling means so as to be rotatable therewith and be movable relative thereto in the axial direction.

According to the present invention as described above, upon automatic wire connection, the wire processing unit is driven from the escape position to the wire insertion position to fit the nozzle hole of the wire processing unit with the upper wire guide, and then the wire electrode is fed by hold rollers, and is guided by the working fluid. Thus, automatic connection of the wire electrode can be smoothly and reliably performed. Further, since the wire processing unit is coupled to the rotating shaft of the driving means through the coupling means arranged coaxially with the rotating shaft of the driving means, the apparatus can be rendered compact and lightweight. In addition, since the driving means operates with a compressed fluid and requires no electricity, safety upon operation of the apparatus can be improved.

BEST MODE OF CARRYING OUT THE INVENTION

An embodiment of the present invention will be described hereinafter with reference to the accompanying drawings.

Figure 1:
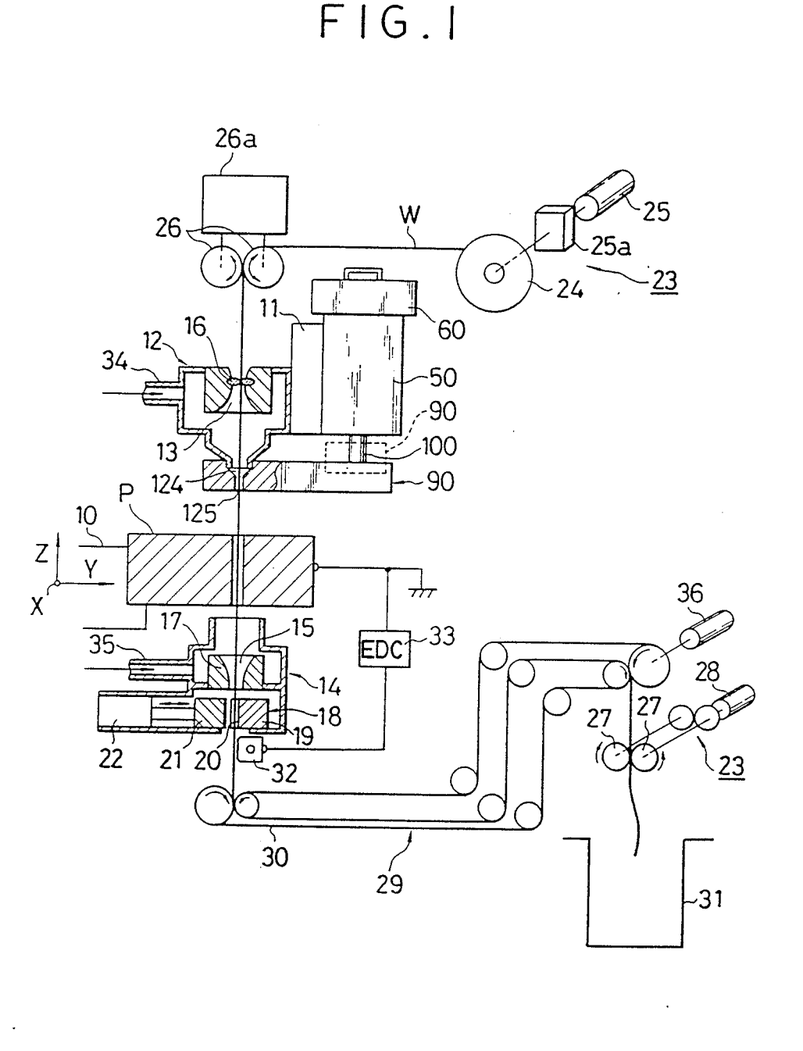
FIG. 1 is a schematic diagram showing a wire electric discharge machine equipped with an automatic wire connecting apparatus according to an embodiment of the present invention.

FIGS. 1 to 9 show an automatic wire connecting apparatus according to an embodiment of the present invention. Referring to FIG. 1, a wire cut electric discharge machine comprises a workpiece table 10 for supporting a workpiece P, the table 10 being arranged to be movable along orthogonal axes X and Y parallel to a base frame (not shown). An upper wire guide 12 having a wire path 13 is arranged above the workpiece table 10, and a lower wire guide 14 having a wire path 15 is arranged below the workpiece table 10. The lower wire guide 14 is fixed to the base frame supporting the workpiece table 10, whereas the upper wire guide 12 is mounted on a support frame 11 which is movable along the axes X and Y and along a vertical axis Z relative to the base frame.

The upper wire guide 12 has a jewel guide 16 having a small hole for precisely positioning a wire electrode W. A portion of the wire path 13 below the jewel guide 16 tapers outwardly towards the lower end thereof. The lower wire guide 14 comprises a guide block 17 having a relatively wide opening, which is widened upward, and a three-point support guide mechanism 18 arranged below the guide block 17. The three-point support guide mechanism 18 has a stationary block 19 formed with a V-shaped groove 20 linearly extending in the vertical direction, and a movable block 21 which is arranged to be reciprocated relative to the stationary block 19 by an actuating device 22 such as a solenoid. When the workpiece P is vertically machined, the wire electrode W is three-point supported in the vertical direction by the V-shaped groove 20 of the stationary block 19 and the movable block 21. When the workpiece P is tapered, the wire electrode W is guided along the surface of the guide block 17.

The wire cut electric discharge machine comprises a wire feed mechanism 23 for feeding the wire electrode W downward from the above of the upper wire guide 12 during electric discharge machining. The wire feed mechanism 23 comprises a wire reel 24, a motor 25 for rewinding the wire electrode W through a clutch 25a when the wire electrode W is broken, a pair of hold rollers 26, 26, a known hold roller drive mechanism 26a for opening/closing and rotating the hold rollers 26, 26, the mechanism 26a being arranged above the upper wire guide 12, a pair of wire feed rollers 27, 27, arranged at one side and below the lower wire guide 14, for clamping the wire electrode W passing through the wire path 15 and feeding it downward, and a motor 28 for driving the rollers 27, 27. A wire recovery device 29 for recoverying the wire electrode W is arranged below the lower wire guide 14, and comprises a belt conveyor device 30 for feeding the wire electrode W to a recovery box 31 while clamping it, and a motor 36 for driving the belt conveyor device. During electric discharge machining, the wire electrode W is continuously fed downward by the wire feed rollers 27, 27, passes through the wire path 1 of the upper wire guide 12, the machining hole or groove of the workpiece P, and the wire path 15 of the lower wire guide 14 in the order named, and then reaches the belt conveyor device 30 of the wire recovery device 29.

Arranged between the lower wire guide 14 and the wire recovery device 29 is a power supply contact 32 through which one end of an electric discharge circuit 33 is connected to the wire electrode W extended between the wire guides 12 and 14, the other end of the electric discharge circuit (EDC) 33 being connected to the workpiece P which is grounded.

Working fluid supply pipes 34 and 35 for supplying a working fluid, e.g., water, to the wire paths 13 and 15 are coupled to the upper and lower wire guides 12 and 14, respectively. During electric discharge machining, the working fluid is supplied to the wire paths 13 and 15. The working fluid supplied to the wire paths 13 and 15 is sprayed toward the workpiece P to cool the wire electrode W. The workpiece P is machined by stable electric discharge in the working fluid, which is generated between the workpiece P and the wire electrode W.

Figure 2:
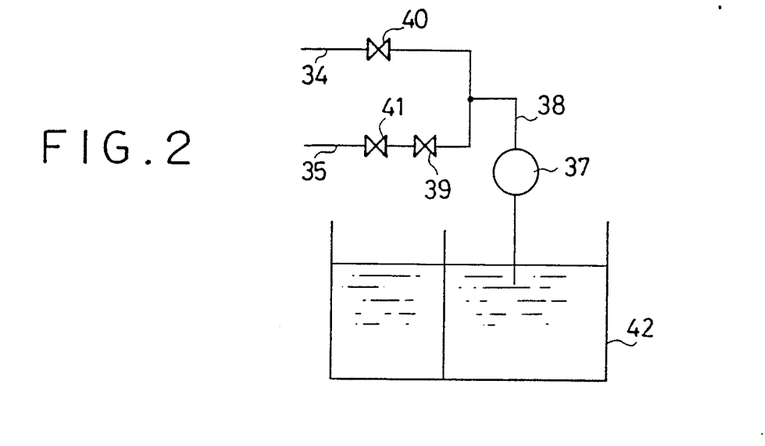
FIG. 2 is a diagram showing a working fluid supply system installed in the electric discharge machine shown in FIG. 1.

Referring to FIG. 2, a delivery pipe 38 of a pump 37 for drawing the working fluid in a fluid tank 42 is coupled to the working fluid supply pipe 34 connected to the upper wire guide 12 through a manual flow rate adjusting valve 40 for adjusting the flow rate of the working fluid. The delivery pipe 38 is also connected to the working fluid supply pipe 35 which is connected to the lower wire guide 14 through an electromagnetic valve 39 and a manual flow rate adjusting valve 41 for adjusting the flow rate. Upon electric discharge machining, the electromagnetic valve 39 is opened, and the working fluid delivered from the pump 37 is supplied to the wire paths 13 and 15 of the wire guides 12 and 14 respectively through the supply pipes 34 and 35. Upon an automatic extension operation o the wire electrode (to be described later), the electromagnetic valve 39 is closed, and the working fluid delivered from the pump 37 is supplied to only the wire path 13 of the upper wire guide 12 through the supply pipe 34.

An automatic wire connecting apparatus installed in the electric discharge machine will be described hereinafter. As shown in FIG. 1 and FIGS. 3 to 5, a pneumatic motor 60 and a pneumatic cylinder 70 are respectively mounted on the upper and circumferential surfaces of a housing 50 fixed to the support frame 11. The motor 60 and the cylinder 70 are coupled to a wire processing unit 90 through a coupling means 80 which is coaxially arranged on a rotating shaft 61 of the motor 60 and is key-coupled thereto.

Figures 3, 4:
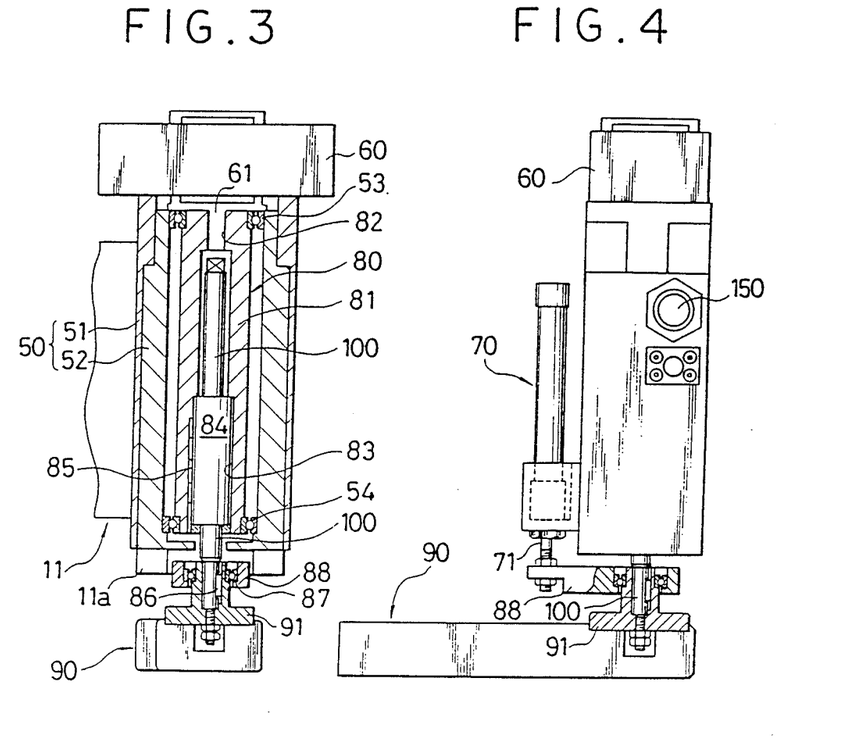
FIG. 3 is a cross-sectional view showing the automatic wire connecting apparatus shown in FIG. 1.
FIG. 4 is a side view of the connecting apparatus.

Referring to FIG. 3, the housing 50 is supported by the support frame 11 and a support member 11a formed integrally therewith, and consists of a box-like cylindrical cover housing 51, and a hollow outer housing 52 which is fitted in the cover housing 51 and rotatably supports a cylindrical intermediate housing 81 of the coupling means 80 through radial bearings 53 and 54. The output rotating shaft 61 of the motor 60 which is mounted on the upper end face of the cover housing 51 is key-coupled (although not shown) to an upper-end small-diameter hole 82 of the intermediate housing 81. The intermediate housing 81 is key-coupled, as indicated by 85, to a cylindrical inner housing 84 fitted in a lower-end large-diameter hole 83 of the housing 81. Although partially omitted from the drawings, the inner housing 84 is formed on the inner surface thereof with a proper number of grooves, and supports a movable shaft 100 extending through a hollow hole of the housing to be rotatable together therewith and be movable relative thereto in the axial direction through the grooves and ball bearings facing the grooves on the side of the movable shaft. Fitted to and key-coupled at 86 to the lower end portion of the movable shaft 100 is a coupling member 91 of the wire processing unit 90 which is supported by a movable plate 88 to be rotatable and be nonmovable relative thereto in the axial direction through ball bearing 87. On the other hand, the movable plate 88 is fixed to a piston rod 71 of the pneumatic cylinder 70 (FIG. 4), and constitutes the coupling means 80 together with the above-mentioned elements 81 to 87.

Figure 5:
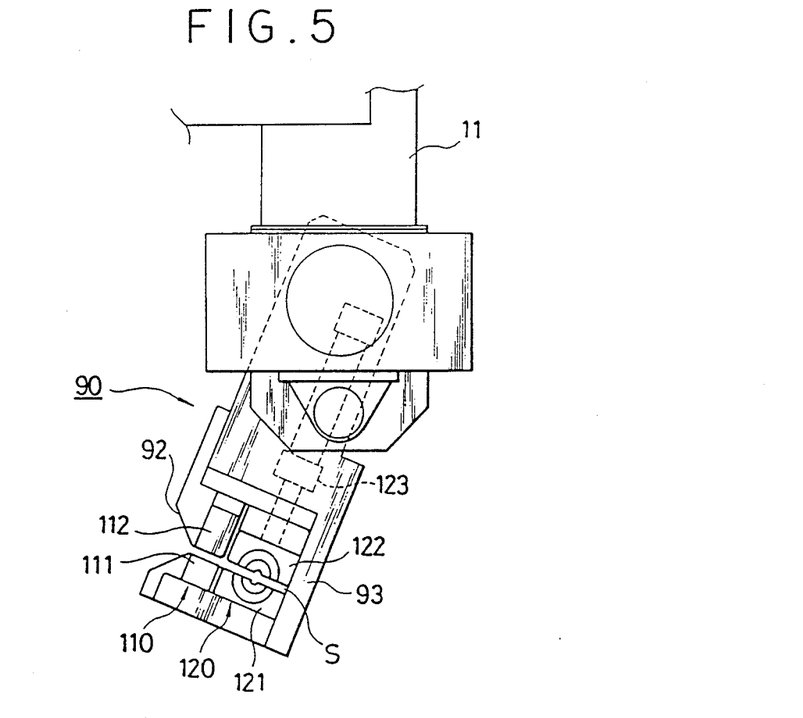
FIG. 5 is a front view of the connecting apparatus.
Figure 6:
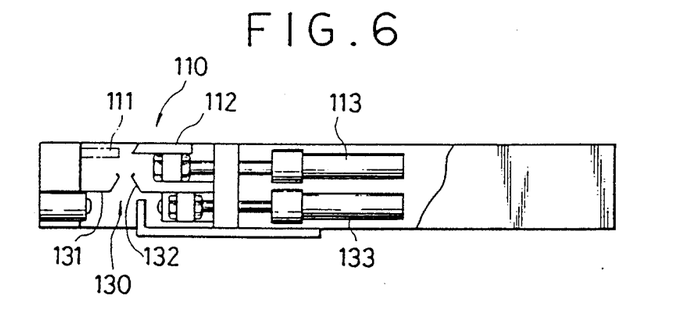
FIG. 6 is a cutaway sectional view showing the internal structure of a wire processing unit.
Figure 7:
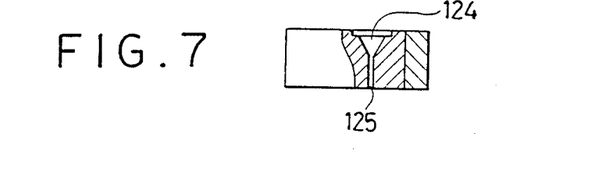
FIG. 7 is a sectional view showing a nozzle hole of the unit.
Figure 8:
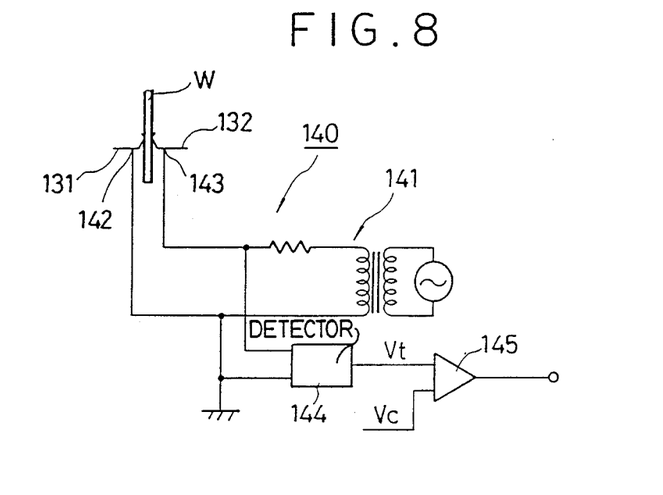
FIG. 8 is a circuit diagram showing a wire electrode detection circuit.

As shown in FIGS. 5 and 6, a V-shaped guide groove 92, which is widened outward, is formed on one side edge of the outer end portion of the wire processing unit 90 in order to smoothly guide the wire electrode W. Arranged adjacent to the guide groove 92 are a wire cutting device 110 and a nozzle hole forming portion 120 which are juxtaposed to each other along the pivot direction of the unit 90. Further, a wire detection device 130 is arranged to be aligned with the cutting device 110 in the pivot direction of the unit 90 and to be separated in the height direction thereof.

The wire cutting device 110 comprises a stationary cutter blade 111 fixed to a unit outer frame 93, and a movable cutter blade 112 which is reciprocated by a pneumatic cylinder 113 with respect to the cutter blade 111. The cutter blades are separated from each other to be capable of receiving the wire electrode W therebetween.

The nozzle hole forming portion 120 consists of a stationary nozzle portion 121 fixed to the outer frame 93 of the unit 90, and a movable nozzle portion 122 arranged to be driven by a pneumatic cylinder 123 (FIG. 5) in a manner approaching and being separated from the nozzle portion 121, i.e., being opened and closed. The nozzle portions 121 and 122 are formed at upper and lower portions of their opposite surfaces with inverted semi-conical holes and small-diameter semi-cylindrical holes each communicating with the corresponding semi-conical hole, respectively. Further, the nozzle portions 121 and 122 are so designed that, when the nozzle hole forming portion 120 is separated, i.e., is opened, the nozzle portions 121 and 122 define, between their opposite surfaces, a slit S (FIG. 5) extending in the pivot direction of the unit 90 and capable of receiving the wire electrode W, and that, when the nozzle hole forming portion 120 is closed, the portions 121 and 122 define an inverted conical hole 124 which is capable of receiving an inverted conical projection formed on the lower wall of the upper wire guide 12, and also define a cylindrical nozzle hole 125 (FIGS. 1 and 7) communicating with the hole 124.

The wire detection device 130 comprises a stationary contact 131 fixed to the outer frame 93, and a movable contact 132 which is reciprocated by a pneumatic cylinder 133 with respect to the contact 131. The contacts 131 and 132 are respectively connected to terminals 142 and 143 of an AC power source circuit 141 of a wire detection circuit 140 shown in FIG. 8. The circuit 140 is so designed that it compares an output Vt from a detector 144 for detecting the potential difference across these terminals with a reference potential Vc by a comparator 145, and generates a signal from the comparator 145 when no wire electrode W is present between the contacts 131 and 132, namely, the contact 131 and 132 are disconnected from each other to generate a potential difference exceeding the reference potential Vc.

Figure 9:
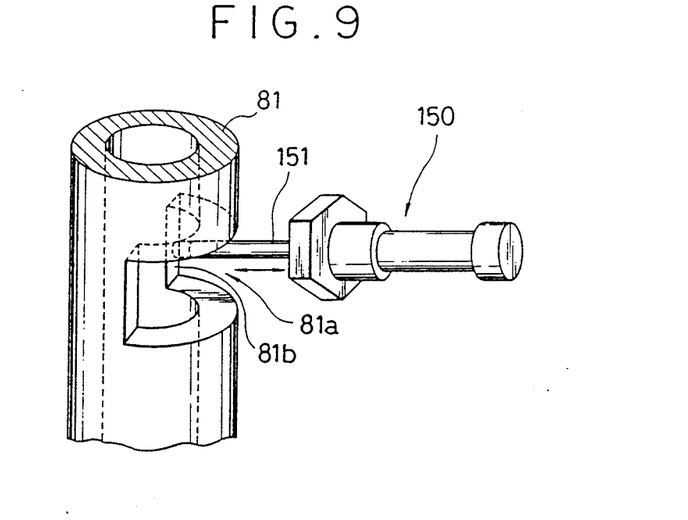
FIG. 9 is a perspective view showing a positioning means.

As shown in FIGS. 4 and 9, a rotary stopper 150, which serves as a positioning means for regulating a pivot position of the wire processing unit 90, is mounted on the housing 50, so that a stopper portion 151 faces a notch 81a, having a semi-circular section, of the intermediate housing 81. The rotary stopper 150 and the stopper portion 151 respectively comprise a pneumatic cylinder and a piston rod thereof. The stopper portion 151 is arranged to be driven for reciprocal motion, so that its distal end abuts against an opposing one-side end face 81b of the notch 81a, so as to prevent rotation of the intermediate housing 81 and the wire processing unit 90 which is rotated in unison therewith. Further, the stopper 150 is arranged so that, upon cutting of the wire, the distal end of the stopper is driven to a reciprocal position corresponding to a pivot position (wire cutting position) of the unit 90, at which the wire electrode W is interposed between the cutter blades 111 and 112, and that, when the wire electrode W is inserted through the hole or the like of the workpiece P, the distal end of the stopper portion is driven backward from the above-mentioned position. As a result, the unit 90 is held in a pivot position (wire insertion position) at which the wire electrode W is inserted through and held by the nozzle hole 125.

Note that a drive control apparatus for the pneumatic motor 60 and the pneumatic cylinder 70 is known, and a detailed description thereof will be omitted.

The operation of the wire cut electric discharge machine having the above arrangement will now be described. During electric discharge machining, the wire electrode W is continuously fed downward by the wire feed rollers 27 while the wire processing unit 90 is disposed beside the wire electrode W which extends; and between the wire guides 12 and 14, the disposition of the processing unit 90 being indicated by the broken lines in FIG. 1. A working is continuously supplied to the wire paths 13 and 15 of the upper and lower wire guides 12 and 14, and is sprayed toward the workpiece P from the wire paths 13 and 15. When tapering machining is performed, the upper wire guide 12 is positioned in the horizontal direction with respect to the lower wire guide 14, so that the wire electrode W is obliquely extended at a predetermined angle.

When the machining position on the workpiece P is changed to be another position separated therefrom, the wire electrode W must be temporarily cut and be connected between the wire guides 12 and 14 at a new position with respect to the workpiece P. In this case, machining is stopped, the motors 28 and 36 are stopped to stop traveling of the wire electrode, the pump 37 is stopped to interrupt supply of the working fluid, and then, the electromagnetic valve 39 is closed. Thereafter, the Z spindle is moved upward to move the upper wire guide 12 upward, and the hold roller drive mechanism 26a is driven to close the hold rollers 26, 26, thereby clamping the wire electrode therebetween. After the wire processing unit 90 is moved downward from a retracted position by the pneumatic cylinder 70, it is rotated clockwise in FIG. 5 by the motor 60, to dispose the wire electrode W between the cutter blades 111 and 112 through the guide groove 92. When the wire cutting device 110 reaches a position immediately below the upper wire guide 12, the wire processing unit 90 is stopped since the notch end face 81b of the inner housing 81 abuts against the stopper portion 151 of the rotary stopper 150. Then, the wire cutting device 110 is operated to cut the wire electrode W. Thereafter, the motors 28 and 36 are driven to rotate the wire feed rollers 27, 27, and the cut wire electrode W is recovered in the recovery box 31 through the belt conveyor device 30. Thereafter, the motor 60 is driven to rotate the wire processing unit 90 counterclockwise in FIG. 5. In this manner, the wire cutting process is ended.

After this process, to perform an automatic extension operation of the wire electrode W, the stopper portion 151 is moved backward, and the wire processing unit 90 is rotated clockwise in FIG. 5. When the nozzle hole 125 reaches a position immediately below the upper wire guide 12, the notch end face 81b abuts against the stopper portion 151, and the wire processing unit 90 is stopped. Next, the nozzle hole forming portion 120 is closed by the pneumatic cylinder 123, and the cut end of the wire electrode W is placed in the nozzle hole 125. In this state, the wire processing unit 90 is moved upward upon operation of the pneumatic cylinder 70, and the inverted conical hole 124 is fitted with and connected to the lower end of the upper wire guide 12. The actuating device 22 is then driven to open the 3-point support guide.

Further, the pump 37 (FIG. 2) is operated to supply the working fluid to the interior of the wire path 13 of the upper wire guide 12 through the supply pipe 34. Since the electromagnetic valve 39 is kept closed, the working fluid cannot be supplied to the wire path 15 of the lower wire guide 14. The working fluid supplied inside the wire path 15 of the upper wire guide 12 is formed into a jet flow and ejected downward through the nozzle hole 125 of the wire processing unit 90. A motor (not shown) for the hold roller mechanism 26a is driven to rotate the hold rollers 26, 26, thereby feeding the wire electrode W downward. The wire electrode W passes through the machining hole or groove of the workpiece P and the wire path 15 of the lower wire guide 14 together with the working fluid. When the wire electrode W is inserted between the belts of the belt conveyor device 30, the hold rollers 26, 26 are opened, the motor 36 is driven, and the wire electrode W is guided toward the wire recovery device 29. At this time, since the wire electrode W is restricted by the flow of the working fluid, it can be smoothly guided into a small hole or a narrow groove of the workpiece P or the narrow path 15 of the wire guide 14.

After the wire electrode W is automatically extended, the pump 37 is stopped, the electromagnetic valve 39 is opened, and the wire processing unit 90 is moved downward to be separated from the upper wire guide 12. Further, the nozzle hole forming portion 120 is opened to allow the wire electrode W to be released therefrom. Thereafter, the wire processing unit 90 is rotated and then is moved upward to be retracted beside the wire electrode W. The three-point support guide 19 is closed, and the Z spindle is moved downward. Thus, the automatic wire connecting operation is completed.

During the electric discharge machining, if the wire electrode W is broken due to some abnormality, the electric discharge machining is stopped upon operation of a breakage detector (not shown). Then, the Z spindle is moved upward to move the upper wire guide upward, and the wire processing unit 90 is moved downward, is then rotated clockwise in FIG. 5, and is stopped when the contacts 131 and 132 of the wire detection device 130 reach positions immediately below the upper wire guide 12. Thereafter, the wire electrode W is drawn upward with rotation of the hold rollers 26, 26 driven by the motor of the hold roller drive mechanism 26a. When the broken end of the wire electrode W is detected by the wire detection device 130, the rotation of the hold rollers 26, 26 is stopped to stop upward movement of the wire electrode W, and the wire electrode W is cut at a position above its broken end by the wire cutting device 110. The end portion of the wire electrode W which is broken in the electric discharge region tends to have a roughened surface or to be bent, and this may disturb the automatic extension operation. However, according to this embodiment where the wire electrode W is cut at a position above its broken end, the automatic extension operation of the wire electrode W can be smoothly performed. After the cutting operation of the wire electrode W by the wire cutting device 110 is completed, the same automatic extension operation as described above is performed.

According to this embodiment, when the wire processing unit 90 is retracted, this unit is drawn upward to the side of the motor 60, but can be simply rotated to a pivot position at which it does not interfere with the wire electrode W.

We claim:

1. An automatic wire connecting apparatus of a wire cut electric discharge machine in which a wire electrode is fed through an upper wire guide arranged above a workpiece and a working fluid supplied to said upper wire guide is sprayed from the upper wire guide to said workpiece, the connecting apparatus comprising:

rotary driving means actuated by a compressed fluid for rotating a shaft;

a wire processing unit coupled to the rotating shaft for rotation therewith, said wire processing unit being movable independently from said upper wire guide; and positioning means for selectively positioning said wire processing unit at a wire insertion position or a retracted position; said wire processing unit having a nozzle hole forming portion, said nozzle hole forming portion having two opposite halves, said two halves defining a slit allowing said wire electrode to pass therethrough when the tow halves are open and defining a nozzle hole capable of fitting with said upper wire guide and of spraying the working fluid when the two halves are closed.

2. An automatic wire connecting apparatus of a wire cut electric discharge machine according to claim 1, wherein said automatic wire connecting apparatus includes coupling means arranged coaxially with the rotating shaft of said rotary driving means; and axial direction driving means, actuated by a compressing fluid, for moving said wire processing unit in the axial direction of the rotating shaft of said rotary driving means; said wire processing unit being coupled to the rotating shaft of said rotary driving means through said coupling means to be rotatable therewith and to be movable relative thereto in an axial direction.

3. An automatic wire connecting apparatus of a wire cut electric discharge machine according to claim 1, further including: wire cutting means juxtaposed to said nozzle hole forming portion in a rotating direction of said wire processing unit, for cutting said wire electrode.

4. An automatic wire connecting apparatus of a wire cut electric discharge machine according to claim 3, further including: wire detecting means arranged to be aligned with said wire cutting means in the rotating direction of said wire processing unit and to be separated apart therefrom in a vertical direction of said wire processing unit, for detecting a broken end of a broken wire electrode.

5. An automatic wire connecting apparatus of a wire cut electric discharge machine according to claim 1, wherein the compressed fluid is compressed air.

6. An automatic wire connecting apparatus of a wire cut electric discharge machine according to claim 3, wherein said wire cutting means is disposed at a location upstream of said nozzle hole forming portion in the rotating direction of said wire processing unit.

7. An automatic wire connecting apparatus of a wire cut electric discharge machine according to claim 2, characterized in that the compressed fluid is compressed air.

8. An automatic wire connecting apparatus of a wire cut electric discharge machine according to claim 2, further including: wire cutting means juxtaposed to said nozzle hole forming portion in a rotating direction of said wire processing unit, for cutting said wire electrode.

9. An automatic wire connecting apparatus of a wire cut electric discharge machine according to claim 1, wherein said upper wire guide has a cylindrical projection allowing the working fluid to pass therethrough, each of opposite faces of said two halves of said nozzle hole forming portion being formed at one side close to said upper wire guide with a half of a first nozzle hole portion which is large in diameter and formed at another side remote from said upper wire guide with a half of a second nozzle hole portion which is small in diameter, respectively, whereby, when said two halves are closed, said opposite faces define therebetween said first nozzle hole portion which is to be fitted with said cylindrical projection and said second nozzle hole portion which is in communication with said first nozzle hole portion and cooperates therewith to form said nozzle hole.

10. An automatic wire connecting apparatus of a wire cut electric discharge machine according to claim 2, wherein said coupling means includes a hollow housing which is rotatably supported by and coupled to said rotary shaft of said rotary driving means, and a movable shaft coupled to said wire processing unit and disposed within said housing for rotation integrally therewith and axial movement relative thereto.

11. An automatic wire connecting apparatus of a wire cut electric discharge machine according to claim 10, wherein said housing of said coupling means is formed with a notch, and said positioning means has stopper portion disposed for reciprocal movement and for contact with said notch.

* * * * *

UNITED STATES PATENT AND TRADEMARK OFFICE
CERTIFICATE OF CORRECTION

PATENT NO. : 4,818,848
DATED : April 4, 1989
INVENTOR(S) : Obara et al.

It is certified that error appears in the above-identified patent and that said Letters Patent is hereby corrected as shown below:

Col. 1, line 60, after "comprising" insert --:--.

Col. 3, line 47 "1" should be --13--.

Col. 4, line 17, "0" should be --of--.

Col. 6, line 19, after "working" insert --fluid--.

Col. 8, line 24, "tow" should be --two--.

Col. 10, line 15, after "has" insert --a--.

Signed and Sealed this

Thirty-first Day of October, 1989

Attest:

DONALD J. QUIGG

Attesting Officer

Commissioner of Patents and Trademarks